United States Patent [19]

Ryan, III et al.

[11] Patent Number: 5,753,806
[45] Date of Patent: May 19, 1998

[54] APPARATUS AND METHOD FOR DETERMINING THE DISTRIBUTION AND FLOW RATE CHARACTERISTICS OF AN INJECTION NOZZLE

[75] Inventors: Thomas W. Ryan, III, San Antonio, Tex.; Kendall R. Swenson, Hubertus, Wis.

[73] Assignee: Southwest Research Institute, San Antonio, Tex.

[21] Appl. No.: 739,163

[22] Filed: Oct. 30, 1996

[51] Int. Cl.$^6$ .............. G01M 15/00; G01F 1/34; G01F 15/075; B67D 5/38

[52] U.S. Cl. .............. 73/119 A; 73/861.44; 239/74

[58] Field of Search .............. 73/49.7, 119 A, 73/168, 721, 727, 756, 861.73, 861.44; 123/378, 390; 239/74

[56] References Cited

U.S. PATENT DOCUMENTS

| | | | |
|---|---|---|---|
| 2,483,637 | 10/1949 | Hawthorne et al. | 73/119 A |
| 3,164,012 | 1/1965 | Childs | 73/119 A |
| 3,338,093 | 8/1967 | Usry et al. | 73/861.73 |
| 3,449,948 | 6/1969 | Kahle et al. | 73/119 A |
| 3,459,049 | 8/1969 | Kamps | 73/119 A |
| 3,511,087 | 5/1970 | Emerson et al. | 73/119 A |

*Primary Examiner*—William L. Oen
*Attorney, Agent, or Firm*—Jenkens & Gilchrist

[57] ABSTRACT

A plurality of piezoelectric sensors are disposed in a spatial array around the ports of an injection nozzle. Separate electrical signals proportional to the instantaneous momentum of fluid discharged from the injection nozzle and impacting on each of the sensors are used to calculate the instantaneous momentum and mass flow rate of fluid impacting each of the sensors.

5 Claims, 2 Drawing Sheets

APPARATUS AND METHOD FOR DETERMINING THE DISTRIBUTION AND FLOW RATE CHARACTERISTICS OF AN INJECTION NOZZLE

BACKGROUND OF THE INVENTION

1. Field of the Invention

This invention relates generally to a test apparatus and method for determining the spatial, temporal and mass flow rate distribution of a fluid discharged through an injection nozzle, and more particularly to such an apparatus and method using an array of pressure sensors to sense the momentum of fluid impacting on each sensor.

2. Description of the Prior Art

The emissions and performance standards for internal combustion engines, and diesel engines in particular, are becoming so stringent that absolute control of the fuel injection process is essential. The mass distribution and velocity of fuel dispersed within each jet of fuel discharged from an injection nozzle are important in fuel-air mixing processes, including interaction of the fuel jets with combustion chamber surfaces. Current understanding of the temporal and spatial location and momentum of the fuel within the fuel jets is limited by a lack of instrumentation to make the acquisition of this important data possible. In addition, present requirements are so stringent that quality control during the manufacture of injection systems includes a manual inspection of the injection characteristics of each injection nozzle. Minor variation in the shape and condition of the injection ports, as well as variations in the internal tolerances in the injection pump, can have significant impact on engine emissions. Heretofore, there has not been any instrumentation or test method available for making quality control checks, in a quantitative sense, of fuel injectors in a production environment.

The present invention is directed to overcoming the above problems. It is desirable to have a test apparatus and method wherein the spatial and temporal distribution of fluid discharged from each jet, or port, of a multiport injection nozzle can be quantitatively measured. It is also desirable to have such a test apparatus and method wherein the total mass flow rate of fluid discharged from each individual port and the mass flow rate of the total fluid simultaneously discharged from the injection nozzle can also be readily determined.

SUMMARY OF THE INVENTION

In accordance with one aspect of the present invention, an apparatus for determining the spatial and temporal distribution and flow rate characteristics of fluid discharged from an injection nozzle includes a chamber and a means for supporting an injection nozzle at a predefined position within the chamber. The apparatus also includes a plurality of sensors disposed within the chamber in a predefined array disposed in spaced relationship with respect to the predefined position within the chamber. Each of the sensors is adapted to deliver an electrical signal that is proportional to the instantaneous momentum of fluid impacting on the sensor. The apparatus further includes a means for receiving the electrical signals from each of the sensors and calculating the instantaneous mass flow rate of fluid impacting on each of the sensors, as well as the total mass flow rate of fluid simultaneously impacting on all of the sensors.

In accordance with another aspect of the present invention, a method for determining the spatial and temporal distribution and flow rate characteristics of fluid discharged from an injection nozzle includes mounting the injection nozzle at a predetermined position within a substantially enclosed chamber, and arranging an array of sensors in a predefined spatial relationship with respect to the mounted injection nozzle. A controllable source of pressurized fluid is delivered to the injection nozzle, discharged from the nozzle, and impacted on a plurality of the sensors in the arranged array. A separate electrical signal is delivered by each of the sensors that is proportional to the instantaneous momentum of fluid discharged from the nozzle and impacting on the sensor. The values of the electrical signals received from each of the sensors is used in the calculation of the instantaneous mass flow rate of fluid impacting on each of the sensors.

DESCRIPTION OF THE PREFERRED EMBODIMENT

Figure 3:
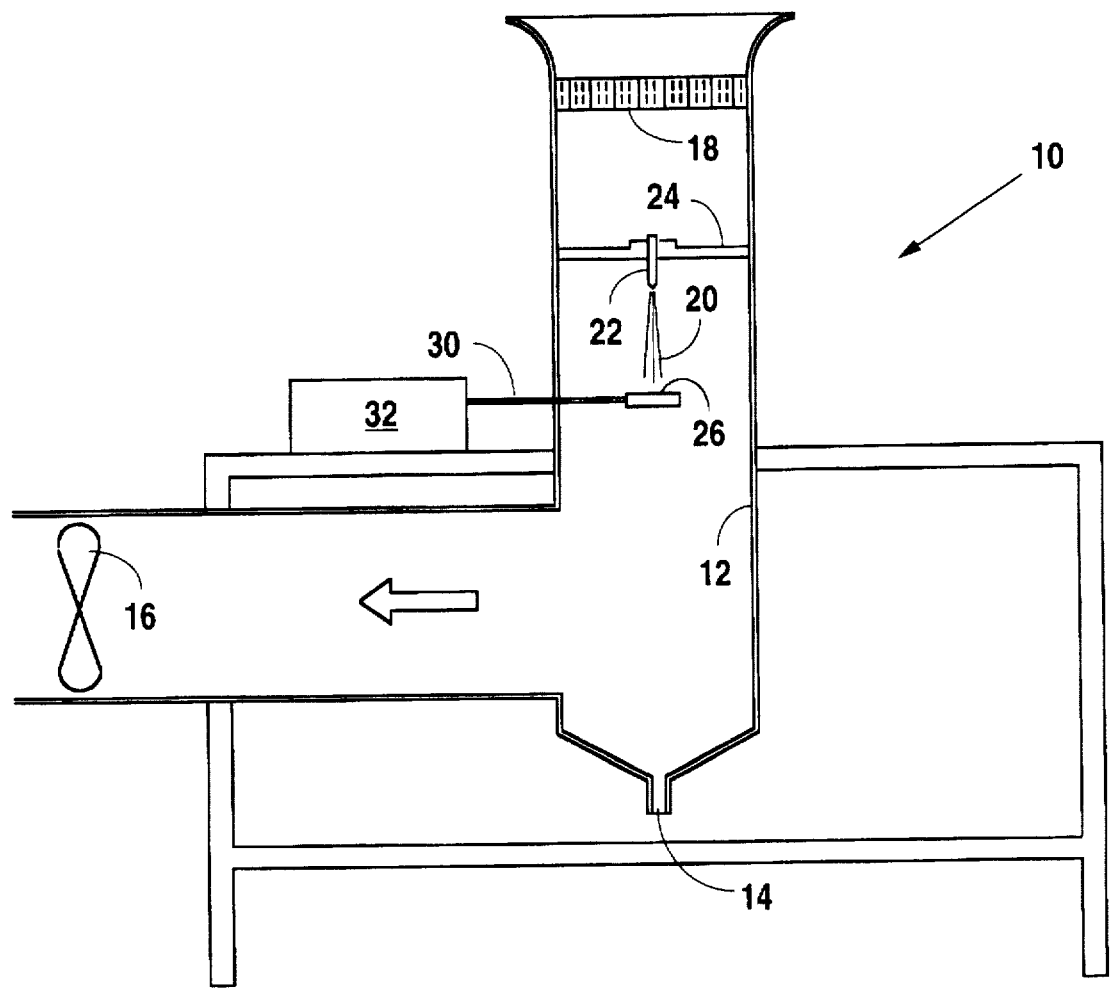
FIG. 3 is a schematic representation of the apparatus embodying the present invention.

As shown schematically in FIG. 3, an apparatus 10, embodying the present invention, includes a housing defining an atmospheric, i.e., open topped, pressure spray chamber 12, having a drain 14 at the bottom associated with a conventional fuel-air separator, not shown, and an exhaust fan 16. A porous, honeycomb flow straightener 18 is positioned across the open top of the chamber 12 to provide a laminar flow of air through the chamber, thereby enhancing the removal of fuel mist and vapor from the chamber and minimizing the effect of air movement on a fuel jet 20 emanating from the ports of a fuel injector 22 mounted in the chamber 12. A web-type support bracket 24 is adapted to removably support the fuel injector 22, for example by a threaded holder, at a predetermined position within the chamber 12.

Figure 2:
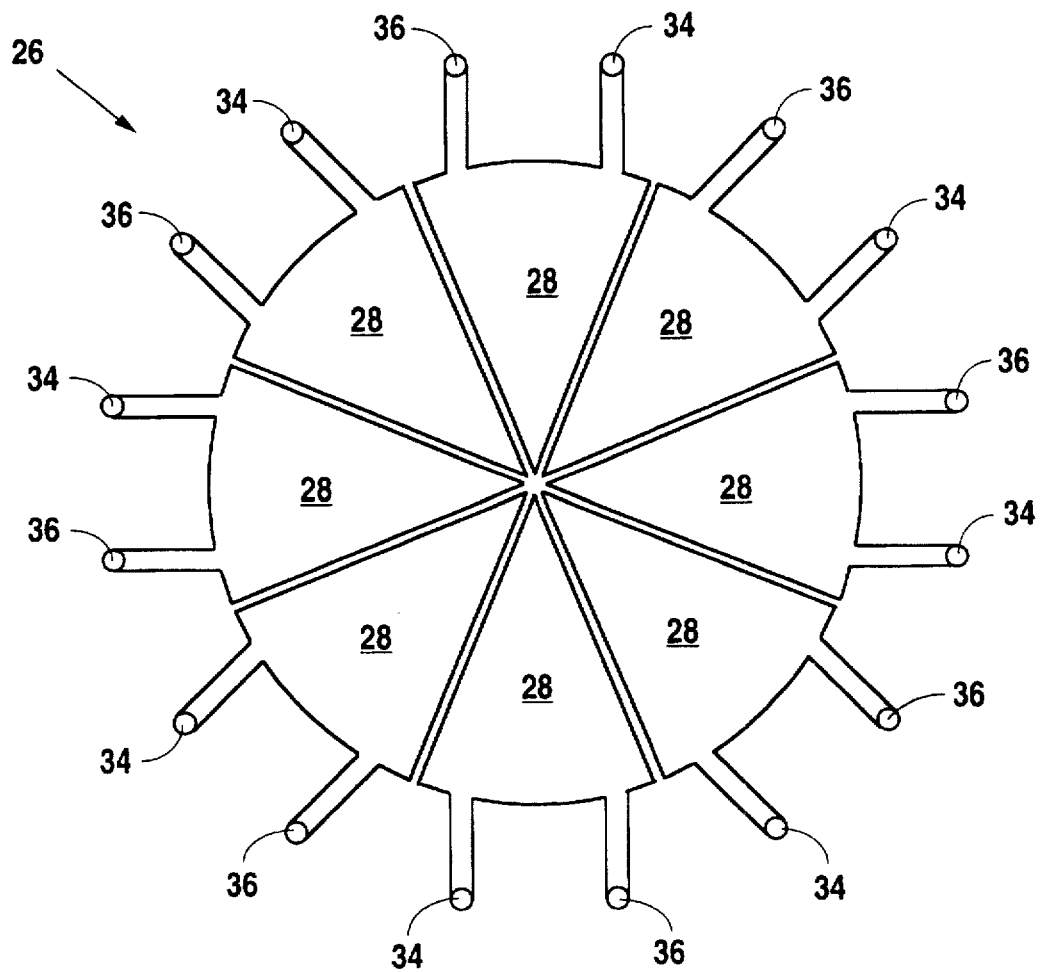
FIG. 2 is a plan view of a sensor arrangement suitable for use in another embodiment of the apparatus embodying the present invention.

For development purposes, and as a convenient means of demonstrating the present invention, the fuel injector 22 shown schematically in FIG. 3, has a single hole, or port, located on the centerline of the tip of the injector 22. A single, planar sensor array 26, comprising eight separate wedge-shaped sensors 28 arranged in a circular pattern, is shown in FIG. 2. The sensor array 26 is mounted on a support 30 connected to a two-dimensional indexing assembly 32 that is used to accurately position the sensor array 26 in a plane perpendicular to the centerline of the spray jet and the nozzle tip. Alternatively, a three-dimensional traversing, or positioning, assembly may be used to further vary the position the array 26 with respect to the injector to allow for variation in symmetry of the spray pattern.

Although not shown, the injection nozzle is connected to a conventional electric motor driven injection pump that is in fluid communication with a source of the fluid to be used in determining the particular distribution and flow characteristics of the injector 22. For laboratory test or calibration purposes, the apparatus 10 may also be equipped with a linear transducer for measurement of the instantaneous position of the needle in the injector's nozzle valve, and a pressure transducer for measuring the injection pressure, i.e., the fluid pressure at the inlet to the injector 22.

The sensors 28 are preferably formed of a piezoelectric sheet film material, such as polyvinylidene fluoride (PVDF) piezoelectric film produced by AMP Corp, Inc. PVDF is a flexible, lightweight, tough plastic film that can be made into a wide range of thicknesses and sizes. In the above-identified illustrative example, the PVDF piezoelectric film has a thickness of about 28 µm. The circular sensor array 26, comprising eight separate sensors 28 shaped as wedges or segments, is illustrated in FIG. 2 and has a diameter of about 22.2 mm, thereby providing each sensor with a surface area of about 8.7 mm².

Because the film is thin, the electrodes are only applied to the top and bottom surfaces of the film so the electrical axis of the film is always normal to the mounting surface. While the entire film is piezoelectric-electric, the actual sensing area is that part of the film that is coated with electrode material. The coating must be applied to both sides of the film which may be conveniently carried out using techniques similar to the formation of circuits on printed circuit boards and thin film substrates. The sensing area is defined by the areas where the coatings overlap, i.e., are disposed on both the top and bottom surface.. The electrical connections to the film are generally made at the edges of the film where the coatings on both surfaces are extended and a mechanical wire attachment is made. These "lead outs" do not overlap each other and, therefore, do not add sensor area.

The sensor array 26 is preferably mounted to a rigid backing member, such as a steel plate, so that the film is always fully constrained and therefore responds to compression in thickness. Also, rigid backing of the film reduces delay in response to impact of fuel on the film.. The attachment of the sensor array 26 to the rigid backing may be conveniently accomplished by a suitable adhesive material, such as epoxy cement.

Piezoelectric sensors produce a voltage in response to pressure applied to the surface of the sensor. More specifically, the electrical output of the piezo-film is represented by:

$$V_o = g_{33} P t; \qquad (1)$$

where:

$V_o$=Open Circuit Voltage Output $g_{33}$=Piezo-film Coefficient ($339 \times 10^{-3}$ (V/m)/N/m))

P=Applied Stress t=Thickness of the film ($28 \times 10^{-6}$ m)

In the above-described sensor construction, the electrical and mechanical axes coincide because the mechanical force acts against the thickness of the film, and the electrodes are installed on both sides of the film. Thus, it is possible to solve the above equation (1) for the applied stress P, based on the measured voltage output and the thickness and coefficient of the film. The result of this calculation is the scale factor needed to convert the measured open circuit piezo-film to the applied stress, i.e.:

$$P = 1.05 \times 10^5 V_o, \text{ and} \qquad (2)$$

$$P*A = \text{Momentum Flux} \qquad (3)$$

(where A is the area of application of the stress P)

As indicated by the above equations, the pressure applied by the impact of fluid discharged under high pressure from one or more discharge ports, or holes, in the injector nozzle, produces an output voltage $V_o$ that has an essentially linear relationship with the applied stress P. Therefore, the instantaneous sensor outputs represent the instantaneous flux of momentum of the fuel jet that is transferred to the film which can be expressed as:

$$M_{dot} = m_{dot} v; \qquad (4)$$

where, $M_{dot}$=Instantaneous Momentum Flux $m_{dot}$=Instantaneous Mass Flow v=Instantaneous Velocity The sensor output voltages $V_o$ can be converted to mechanical units using the following equation:

$$M_{dot} = m_{dot} v = K V_o A \qquad (5)$$

where,

K=Sensor Calibration Factor $V_o$=Sensor Voltage Output

A=Sensor Area

Since the piezo-film is mounted normal to the axis of the jet from the injector, equation (5) can be used directly to calculate the instantaneous momentum flux $M_{dot}$ for each sensor 28. These instantaneous values can be integrated over all of the sensors 28 in the array 26 to give the total instantaneous momentum flux within the jet. In addition, the total momentum flux of the jet can be computed by integrating the total instantaneous momentum over the time of injection. Also, since the relative position of each sensor is known, the value of the specific mass flow at each position can be identified. By adding together the mass flow of all of the sensors 28 at a specific point in time, the total instantaneous mass flow of the injector 22 can be easily determined.

Figure 4:
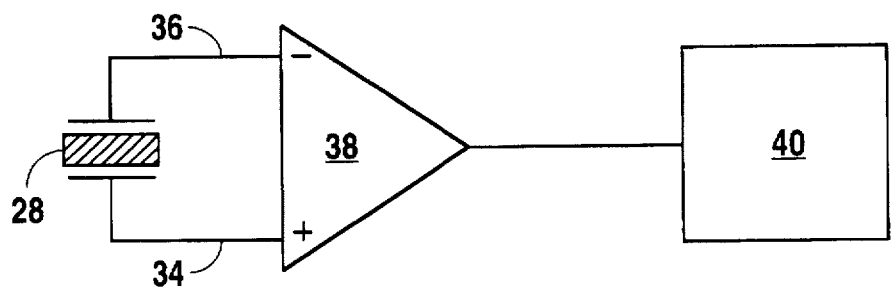
FIG. 4 is a schematic representation of a means for receiving and processing electrical signals and calculating fluid flow characteristics in the apparatus embodying the present invention.

Lead wires 34,36 are respectively attached to the positive and negative terminals of each sensor 28 of the array 26. It is essential that in piezo-film charge producing devices, that the input impedance of the recording circuitry be extremely high in order to prevent a current flow that would affect the voltage output and the frequency response of the film. In the exemplary embodiment described herein, a PC based data acquisition system 40, shown schematically in FIG. 4, includes an INTEL® 486 microprocessor operating at 33 MHZ or greater, and equipped with a National Instruments 16 channel multiplexed A-D board capable of a total data through-put rates of 100 kHz. LABVIEW® Virtual Instrument™ software is used to control the data acquisition process and to reduce the data to the appropriate mechanical units. The input impedance of the data acquisition system 40 is too low for direct conversion of the sensor 28 outputs. A signal conversion circuit 38, comprising a 1NA110 operational amplifier, disposed between the sensors 28 and the data acquisition system 40, is used to match the output requirement of the film with the input requirements of the data acquisition system 40. The resultant system has a frequency response of 16 kHz. The analog signal from the sensors 28 is thus delivered to the data acquisition system 40 whereat the analog signals are converted to digital values by the A-D board of the system, which provides a value for use by the system in the calculation of the instantaneous mass flow rate.

In designing the sensor array 26, it is desirable that the sensors 28 be substantially symmetrically positioned with respect to the discharge ports of the injector 22, and that the pressure-sensing surface of each sensor 28 be positioned substantially perpendicular to the axis of the radiated jet stream. Likewise, in multiple array arrangements, it is desirable that each sensor 28 within an array have substantially equal surface areas to negate the effect of varying force-sensing surface areas.

Figure 1:
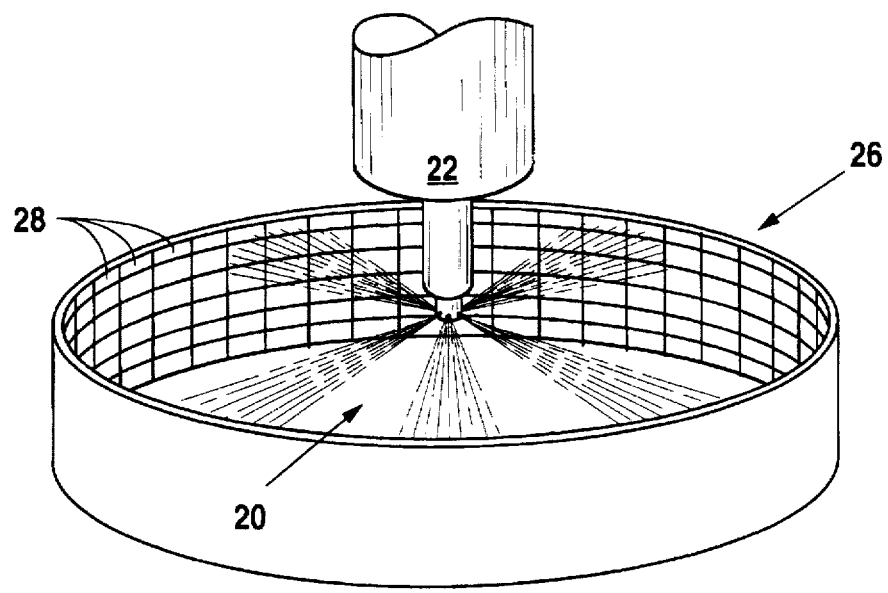
FIG. 1 is a simplified pictorial representation of a sensor array that is circumferentially disposed around the discharge nozzle of a fuel injector in the preferred embodiment of the apparatus embodying the present invention.

In a preferred exemplary embodiment of the present invention, shown in FIG. 1, a cylindrical array 26 of sensors 28 is symmetrically spaced, coaxially with the centerline of the injector 22, about the injector tip. The cylindrical array 26 has a height, or length, along its longitudinal axis that is greater than the height of the fuel plumes 20, and each of the sensors 28 is much smaller than the width of the plume 20. As described above, the output voltage of each sensor 28 is individually detected and used to provide spatial resolution of the force imparted. Thus, the mass flux distribution across each of the individual plumes, or jets, 20 can also be determined.

In another arrangement, the sensors 28 may be arranged in groups of eight to form an array 26 as shown in FIG. 2, and a plurality of the eight-sensor arrays 26 spatially arranged to provide sensors that are desirably positioned at defined optimum impact areas for each individual jet of an injector nozzle.

INDUSTRIAL APPLICABILITY

The apparatus 10 and method embodying the present invention is particularly useful for measuring the instantaneous injection rate and the fuel distribution with individual plumes discharged from an injection nozzle. The signal from each sensor 28 can be integrated over area to determine the overall injection rate, and integrated over time to arrive at the total quantity of fuel injected.

The apparatus 10 and method embodying the present invention also provides an easily automated quality control tool during the manufacture of injection nozzles to monitor various machining processes and assure compliance with predefined performance standards.

Although the present invention is described in terms of preferred exemplary embodiments, with specific illustrative key sensor constructions and arrangement, those skilled in the art will recognize that changes in those arrangements and constructions may be made without departing from the spirit of the invention. Such changes are intended to fall within the scope of the following claims. Other aspects, features and advantages of the present invention can be obtained from a study of this disclosure along with the appended claims.

What is claimed is:

1. An apparatus for determining the spatial and temporal distribution and flow rate characteristics of fluid discharged from an injection nozzle, comprising:

a housing having a chamber defined therein;

a means for removably supporting said injection nozzle at a predefined position within said chamber;

a plurality of piezoelectric sensors disposed within said chamber and arranged in a predefined spatial array in spaced relationship with said predefined position, each of said piezoelectric sensors being adapted to deliver an electrical signal proportional to the instantaneous momentum of a fluid impacting on a respective one of said piezoelectric sensors;

a means for receiving said electrical signal from each of said piezoelectric sensors and calculating the instantaneous momentum and mass flow rate of fluid impacting on each of said piezoelectric sensors and the flow rate of fluid simultaneously impacting on all of said piezoelectric sensors.

2. An apparatus, as set forth in claim 1, wherein said means for receiving said electrical signal from each of said sensors and calculating the instantaneous momentum and mass flow rate of fluid impacting on each of said sensors and the flow rate of fluid simultaneously impacting on all of said sensors includes an analog to digital signal converter and a programmable computer.

3. A method for determining the spatial and temporal distribution and flow rate characteristics of fluid discharged from an injection nozzle, comprising:

mounting an injection nozzle at a predetermined position within a substantially enclosed chamber defined within a housing;

arranging an array of piezoelectric sensors in a predefined spatial relationship with respect to said mounted injection nozzle;

delivering a controllable source of pressurized fluid to said injection nozzle;

discharging said pressurized fluid from said injection nozzle and impacting the discharged fluid on a plurality of the piezoelectric sensors arranged in said array;

delivering separate electrical signals proportional to the instantaneous momentum of fluid discharged from said injection nozzle and impacting on each of the piezoelectric sensors arranged in said array; and receiving said electrical signals from each of said piezoelectric sensors and calculating the instantaneous momentum and mass flow rate of fluid impacting each of said piezoelectric sensors.

4. A method for determining the spatial and temporal distribution and flow rate characteristics of an injection nozzle, as set forth in claim 3, wherein said method includes calculating the total flow rate of fluid simultaneously impacting on all of said piezoelectric sensors.

5. A method for determining the spatial and temporal distribution and flow rate characteristics of an injection nozzle, as set forth in claim 3, wherein the step of receiving said electrical signals from each of said piezoelectric sensors and calculating the instantaneous momentum and mass flow rate of fluid impacting each of said piezoelectric sensors includes converting each of said electrical signals from an analog signal delivered by a respective one of said piezoelectric sensors to a digital signal, and transmitting said digital signal to a programmable computer.

* * * * *